(12) United States Patent
Yang et al.

(10) Patent No.: US 12,704,976 B2
(45) Date of Patent: Aug. 11, 2026

(54) METHOD OF DETECTING OVER-PROGRAMMING IN A SOLID-STATE DRIVE

(71) Applicant: Microchip Technology Incorporated, Chandler, AZ (US)

(72) Inventors: Nian Niles Yang, Mountain View, CA (US); Pitamber Shukla, San Jose, CA (US); Ramyakanth Edupuganti, San Jose, CT (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/956,787

(22) Filed: Nov. 22, 2024

(65) Prior Publication Data

US 2026/0056667 A1 Feb. 26, 2026

Related U.S. Application Data

(60) Provisional application No. 63/685,935, filed on Aug. 22, 2024.

(51) Int. Cl.
*G06F 3/06* (2006.01)

(52) U.S. Cl.
CPC .......... *G06F 3/0619* (2013.01); *G06F 3/0653* (2013.01); *G06F 3/0659* (2013.01); *G06F 3/0679* (2013.01)

(58) Field of Classification Search
CPC .... G06F 3/0619; G06F 3/0653; G06F 3/0659; G06F 3/0679

(Continued)

(56) References Cited

U.S. PATENT DOCUMENTS 7,215,575 B2 * 5/2007 Chen .................. G11C 16/0483 365/185.02
8,755,229 B1 * 6/2014 Beltrami ................ G11C 16/10 365/185.12

(Continued)

FOREIGN PATENT DOCUMENTS

EP 3891744 B1 7/2023

OTHER PUBLICATIONS

International Search Report and Written Opinion for PCT Application No. PCT/US2024/057061 (Dated May 9, 2025).

(Continued)

*Primary Examiner* — Hosain T Alam
*Assistant Examiner* — Zubair Ahmed
(74) *Attorney, Agent, or Firm* — Hovey Williams LLP

(57) ABSTRACT

A method of detecting an over-programming of a memory cell during a write operation in a non-volatile memory media of a solid-state drive, and a solid-state drive with over-programming detection. When data is written to the states of the memory cell, a current last bit is routinely or selectively checked to detect an over-programming condition of the current state. An over-programming verification level may be used to check the current last bit and may be between zero and twenty-five millivolts lower than a regular programming verification level for a next first bit of the next state. When the over-programming condition is not detected, the program operation continues to write data to the next state. When the over-programming condition is detected, either the over-programmed current last bit is identified and the program operation is adjusted, or a memory block in which the over-programmed current last bit is located is retired.

20 Claims, 5 Drawing Sheets

(58) Field of Classification Search
USPC .................................................. 711/103, 102
See application file for complete search history.

(56) References Cited

U.S. PATENT DOCUMENTS

| | | | | |
|---|---|---|---|---|
| 2005/0157552 | A1 | 7/2005 | Hemink et al. | |
| 2015/0310938 | A1* | 10/2015 | Kim | G11C 29/42 714/721 |
| 2019/0362798 | A1 | 11/2019 | Yang et al. | |
| 2023/0067570 | A1* | 3/2023 | Bates | G06F 3/0679 |
| 2023/0069200 | A1* | 3/2023 | Zhang | G06F 3/0655 |
| 2023/0307054 | A1* | 9/2023 | Manwani | G11C 16/0483 |

OTHER PUBLICATIONS

Mohamed E. El-Hawary, et al., "Nonvolatile Memory Technologies With Emphasis on Flash," IEEE Press, pp. 283 and 284 and figure 6.92 (2008).

* cited by examiner

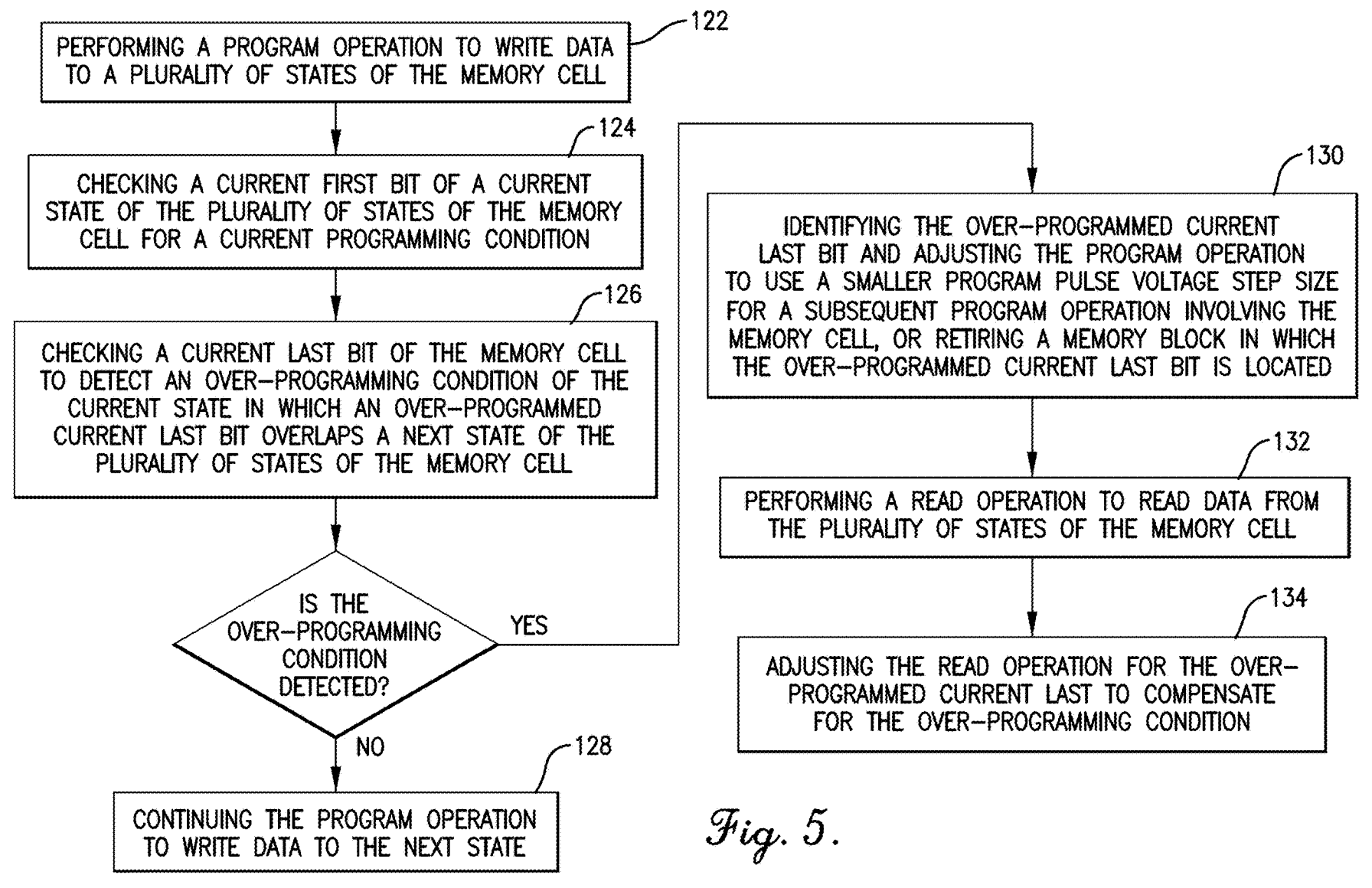

122 PERFORMING A PROGRAM OPERATION TO WRITE DATA TO A PLURALITY OF STATES OF THE MEMORY CELL

124 CHECKING A CURRENT FIRST BIT OF A CURRENT STATE OF THE PLURALITY OF STATES OF THE MEMORY CELL FOR A CURRENT PROGRAMMING CONDITION

126 CHECKING A CURRENT LAST BIT OF THE MEMORY CELL TO DETECT AN OVER-PROGRAMMING CONDITION OF THE CURRENT STATE IN WHICH AN OVER-PROGRAMMED CURRENT LAST BIT OVERLAPS A NEXT STATE OF THE PLURALITY OF STATES OF THE MEMORY CELL

IS THE OVER-PROGRAMMING CONDITION DETECTED?

NO

128 CONTINUING THE PROGRAM OPERATION TO WRITE DATA TO THE NEXT STATE

YES

130 IDENTIFYING THE OVER-PROGRAMMED CURRENT LAST BIT AND ADJUSTING THE PROGRAM OPERATION TO USE A SMALLER PROGRAM PULSE VOLTAGE STEP SIZE FOR A SUBSEQUENT PROGRAM OPERATION INVOLVING THE MEMORY CELL, OR RETIRING A MEMORY BLOCK IN WHICH THE OVER-PROGRAMMED CURRENT LAST BIT IS LOCATED

132 PERFORMING A READ OPERATION TO READ DATA FROM THE PLURALITY OF STATES OF THE MEMORY CELL

134 ADJUSTING THE READ OPERATION FOR THE OVER-PROGRAMMED CURRENT LAST TO COMPENSATE FOR THE OVER-PROGRAMMING CONDITION

*Fig. 5.*

METHOD OF DETECTING OVER-PROGRAMMING IN A SOLID-STATE DRIVE

RELATED APPLICATION

The present U.S. non-provisional patent application is related to and claims priority benefit of an earlier-filed U.S. provisional patent application titled "Method of Detecting Over-Programming in a Solid-State Drive," Ser. No. 63/685,935, filed Aug. 22, 2024. The entire content of the identified earlier-filed application is incorporated by reference as if fully set forth herein.

FIELD

The present disclosure relates to solid-state drives and methods of implementing them, and more particularly, the various examples described herein concern a method of detecting an over-programming of a memory cell during a write operation in a non-volatile memory media of a solid-state drive, and a solid-state drive with over-programming detection.

BACKGROUND

Solid-state drives (SSD) use non-volatile memory (NVM) media (e.g., NAND-based memory media) for data storage, and typically include application-specific integrated circuit (ASIC) controllers for managing read, write, and other operations. SSDs are typically used in high-performance computing (HPC) applications, including artificial intelligence (AI), and enterprise computing data center solutions (DCS). It is generally desirable to improve the performance and reduce the cost of SSDs, but it can be difficult to do so.

This background discussion is intended to provide related information, and is not necessarily prior art.

SUMMARY

Examples provide a method of detecting an over-programming of a memory cell during a write operation in a non-volatile memory media of an SSD, and an SSD with over-programming detection. Broadly, examples employ a double verification of the lower and upper tails, or first and last bits of each state, to detect over-programming of a memory cell, wherein over-programming occurs when the upper tail, or last bit, of a current state overlaps the lower tail, or first bit, of a next state. Examples advantageously improve the data reliability of the SSD by preventing data errors and data failures that could otherwise disrupt data center services.

In an example, a method of detecting an over-programming of a memory cell during a write operation in an NVM media of an SSD may include the following steps. A program operation may be performed to write data to a plurality of states of the memory cell. A current first bit of a current state of the plurality of states of the memory cell may be checked for a current programming condition. A current last bit of the memory cell may be checked to detect an over-programming condition of the current state in which the current last bit overlaps a next state of the plurality of states of the memory cell. Based on the detection of the over-programming condition, the over-programmed current last bit may be identified and the program operation may be adjusted to use a smaller program pulse voltage step size for a subsequent program, or write, operation involving the memory cell. Alternatively, a memory block in which the over-programmed current last bit is located may be retired.

In another example, an SSD with over-programming detection of a memory cell during a write operation may include an NVM media and a controller. The NVM media may be configured to store data, and the controller may be configured to perform the following functions. A program operation may be performed to write data to a plurality of states of the memory cell. A current first bit of a current state of the plurality of states of the memory cell may be checked for a current programming condition. A current last bit of the memory cell may be checked to detect an over-programming condition of the current state in which an over-programmed current last bit overlaps a next state of the plurality of states of the memory cell. The program operation may continue to write data to the next state when the over-programming condition is not detected. One of the following operations may be performed when the over-programming condition is detected. The over-programmed current last bit may be identified and the program operation may be adjusted to use a smaller program pulse voltage step size for a subsequent program operation involving the memory cell. Alternatively, a memory block in which the over-programmed current last bit is located may be retired.

The preceding examples may further include any one or more of the following features. The NVM media may be a NAND-based memory media. Identifying the over-programmed current last bit may include recording an address and a bit location for the over-programmed current last bit, and recording a temperature for the program operation at which the over-programming condition occurred. An over-programming verification level used to check the current last bit of the memory cell to detect the over-programming condition of the current state may be identical to or lower (e.g., between one (1) and one hundred fifty (150) millivolts lower, depending on the number of bits stored per cell) than a regular programming verification level used to check a next first bit of the next state of the plurality of states of the memory cell. Checking the current last bit of the memory cell to detect the over-programming condition of the current state may be selectively performed when the memory cell is determined to have been subjected to a higher rate of program and erase cycles than an established standard rate of program and erase cycles, or when the program operation is determined to be occurring at a lower temperature than an established standard temperature. The method operations or the controller functions may further include performing a read operation to read data from the plurality of states of the memory cell, and adjusting the read operation for the over-programmed current last bit to compensate for the over-programming condition.

This summary is not intended to identify essential features of the examples, and is not intended to be used to limit the scope of the claims. These and other aspects of the present examples are described below in greater detail.

DRAWINGS

Examples are described in detail below with reference to the attached drawing figures, wherein:

FIG. 5 is a flowchart of operations in an example of a method of detecting an over-programming of a memory cell during a write operation in an NVM media of an SSD.

Figure 1:
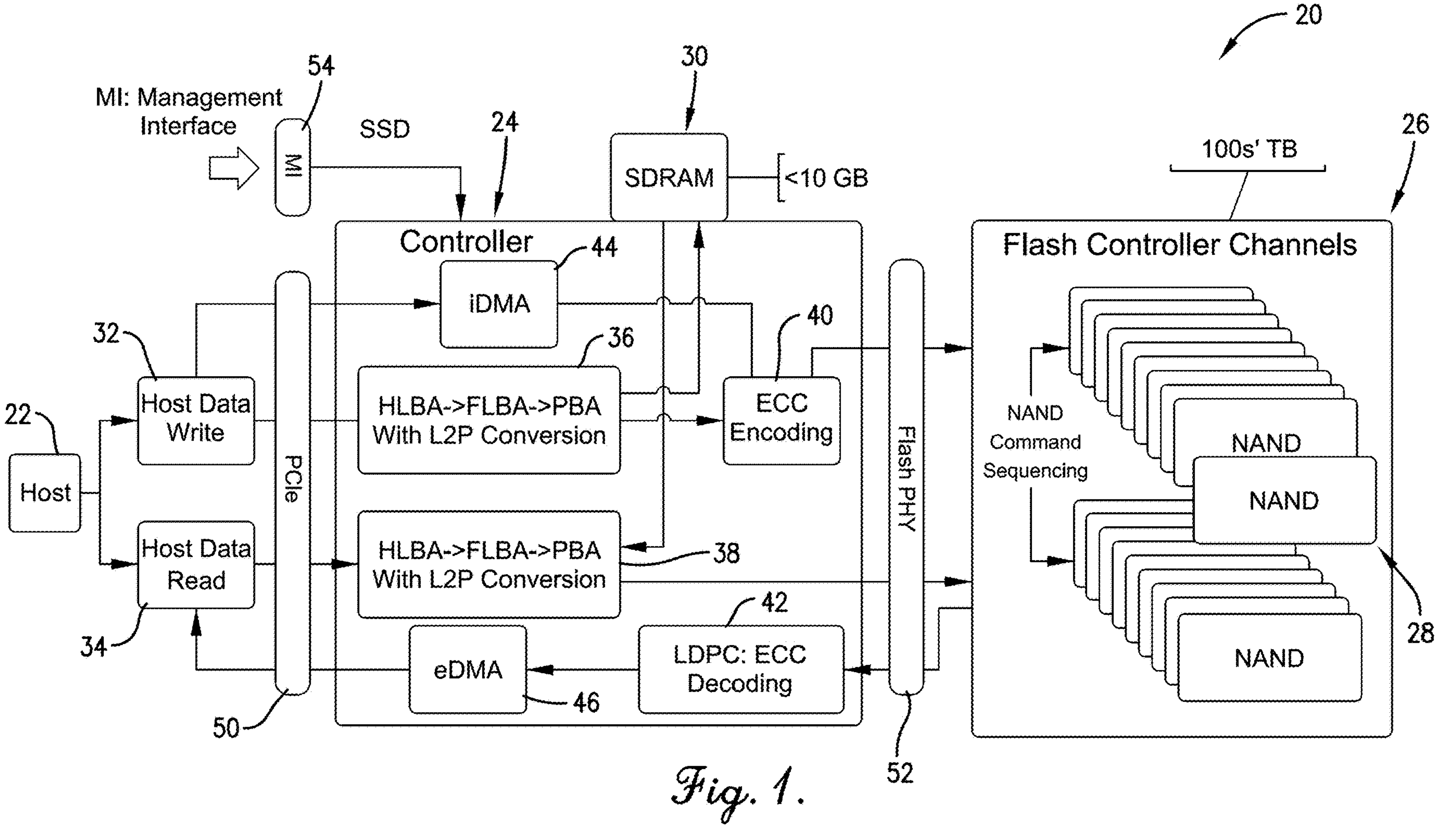
FIG. 1 is a high-level block diagram of components and operations of an SSD with over-programming detection of a memory cell during a write operation in an NVM media of the SSD.

The figures are not intended to limit the examples to the specific details depict. The drawings are not necessarily to scale.

DETAILED DESCRIPTION

In the following detailed description, reference is made to the accompanying drawings, which form a part hereof and in which are shown, by way of illustration, specific examples in which the present disclosure may be practiced. These examples are described in sufficient detail to enable a person of ordinary skill in the art to practice the present disclosure. However, other examples may be utilized, and structural, material, procedural, operational, and other changes may be made without departing from the scope of the disclosure. Unless clearly understood or expressly identified otherwise, structures, materials, procedures, operations, and other aspects described in the context of one example may be incorporated into other examples.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, any similarity in numbering does not necessarily mean that the structures or components are necessarily identical in size, composition, configuration, or any other property.

Terms of relative location and direction (e.g., above, below, left, right, upper, lower) may be used to facilitate the present descriptions of examples with reference to the figures, but unless clearly understood or expressly identified otherwise, these terms are not meant to be limiting with regard to location, direction, or overall orientation, and may, for example, change as a result of a change in overall orientation.

It will be readily understood that the components of the examples as generally described herein and illustrated in the drawings could be arranged and designed in a wide variety of different configurations. Thus, the following description of various examples is not intended to limit the scope of the present disclosure but is merely representative of various examples.

Data centers employ large numbers of SSDs that are under constant workload for data center customers. The reliability and stability of each SSD depends on the quality of the data in its multi-level cell NVM. When these multi-level cells, such as triple-level cell (TLC), quad-level cell (QLC), and penta-level cell (PLC) NAND flash, are programmed, a program verify (PGMV) operation is performed to ensure that the cells have been successfully programmed to the targeted state. Over-programming occurs when a cell that is supposed to be programed to, e.g., state X, is programmed to state Y or even Z. Over-programming can result from a decreasing margin between the programming states, which can lead to data error, such as cross-page failures that cannot be fixed by soft-bit reading (SBR). Conventionally, NAND programming is subject to single verification, so an over-programmed cell may pass the conventional programming verification for state X, but it may cause a state Y or Z read error. Currently, there is no effective way to handle over-programming and its impact on SSD data integrity.

Examples of the present disclosure provide a method of detecting an over-programming of a NAND memory cell in an NVM media and preventing hard-decoding due to over-programming, and an SSD with over-programming detection. More specifically, examples employ a double verification of the lower and upper tails, or first and last bits of each state, to detect over-programming of a memory cell, wherein over-programming occurs when the upper tail, or last bit, of a current state overlaps the lower tail, or first bit, of a next state. Examples advantageously improve the data reliability of the SSD by preventing data errors and data failures that could otherwise disrupt data center services. Further, examples advantageously allow for monitoring the SSD's behavior as it ages and adjusting the verification process as appropriate. Applicable industries include hyper-scale DCS with high-capacity SSDs using QLC/PLC NAND devices, and data processing for artificial intelligence.

Referring to FIG. 1, a high-level block diagram of components, operations, and an operating context of an SSD 20 is shown including a host 22 configured to write and read data to and from the SSD 20; a controller 24 configured to control various SSD operations, such as those discussed below; and an NVM media 26, such as a NAND-based memory media in the form of a plurality of NAND dies 28. Each NAND die 28 may include one or more planes, each plane may include multiple blocks, each block may include multiple pages, and each page may include multiple cells. Each block may be arranged as an array of wordlines (WLs) and bitlines (BLs), with each WL representing a page. Although described herein with regard to NAND-based memory media, examples may employ substantially any suitable memory array technology, such as NOR-based memory media and dynamic random access memory (DRAM).

Generally, the SSD 20 may operate as follows. A write or read request may be received from the host 22 via a peripheral component interconnect express (PCIe) or other suitable interface 50. PCIe is a standardized interface for motherboard components. The controller 24 may use logical block addresses (LBAs) and physical block addresses (PBAs) to facilitate access for data storage in and retrieval from the NVM 26. LBAs are an abstraction to allow the operating system to interact with the NVM 26, and PBAs represent the actual hardware locations within the NVM 26. To facilitate interacting with the NVM 26, the controller 24 may create an entry or record that assigns an LBA to a PBA. To keep track of all such LBA-to-PBA assignments, the controller 24 may use a logical-to-physical (L2P) mapping table. The L2P table may be uploaded to synchronous dynamic random access memory (SDRAM) 30 so that it can be more quickly accessed and updated by the controller 24. When a write or read data request 32, 34 is received from the host 22, the controller 24 performs a reference operation 36, 38 to the L2P mapping table to determine the PBA within the NVM 26 corresponding to a desired LBA. Once the PBA is determined, the controller 24 accesses the appropriate NVM cell to write or read the data.

Access to the NVM 26 may be via a flash physical (PHY) or other suitable interface 52. The controller 24 may employ an error correction code (ECC) operation 40, 42 during encoding and decoding of data to detect and correct errors and enhance data integrity. Additionally, the SSD 20 may support a direct memory access (DMA) operation 44, 46 enabling data to be written from the host 22 directly to the NVM 26 and read from the NVM 26 directly to the host 22. Certain commands, such as the disablement commands described herein, may be issued to the controller 24 using the host command layer, or non-volatile memory express management (NVMe-MI) or other suitable interface 54.

Figure 2:
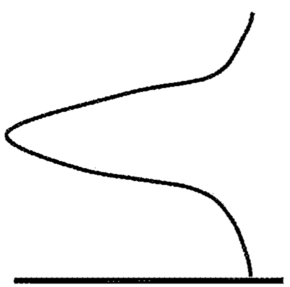
FIG. 2 is a depiction of programming of a memory cell of an SSD without over-programming such that bits belonging to a current state do not overlap with a next state.
Figure 2:
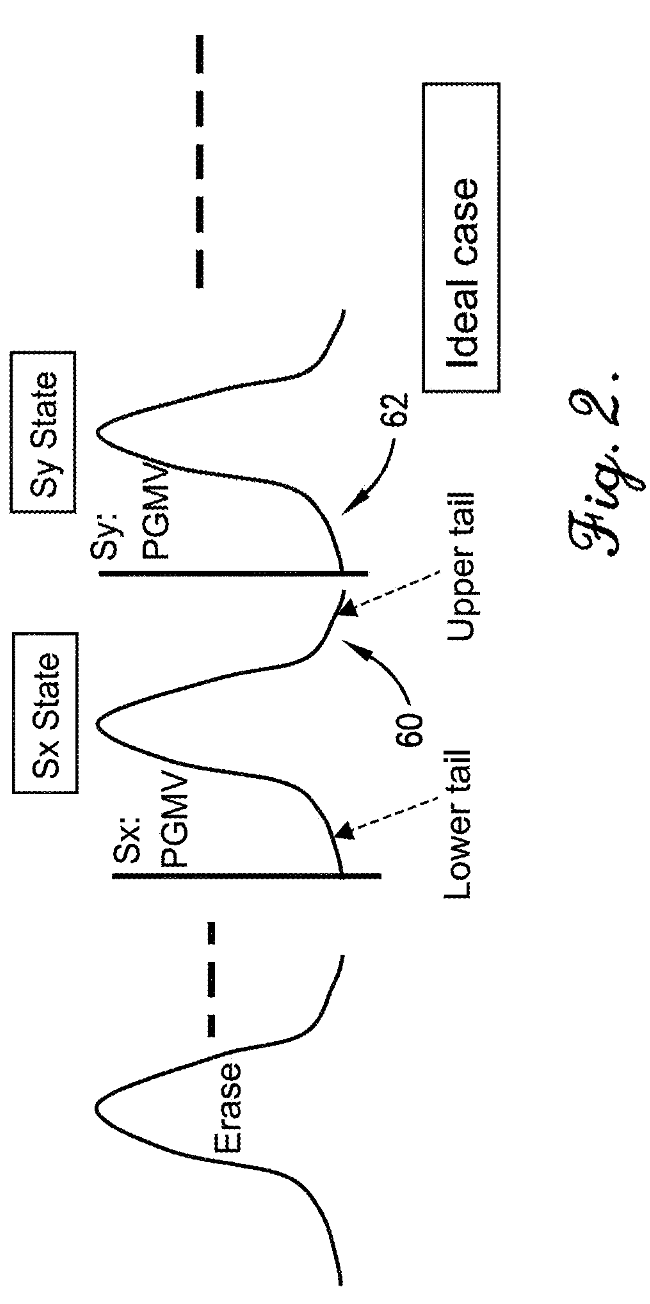
Figure 3:
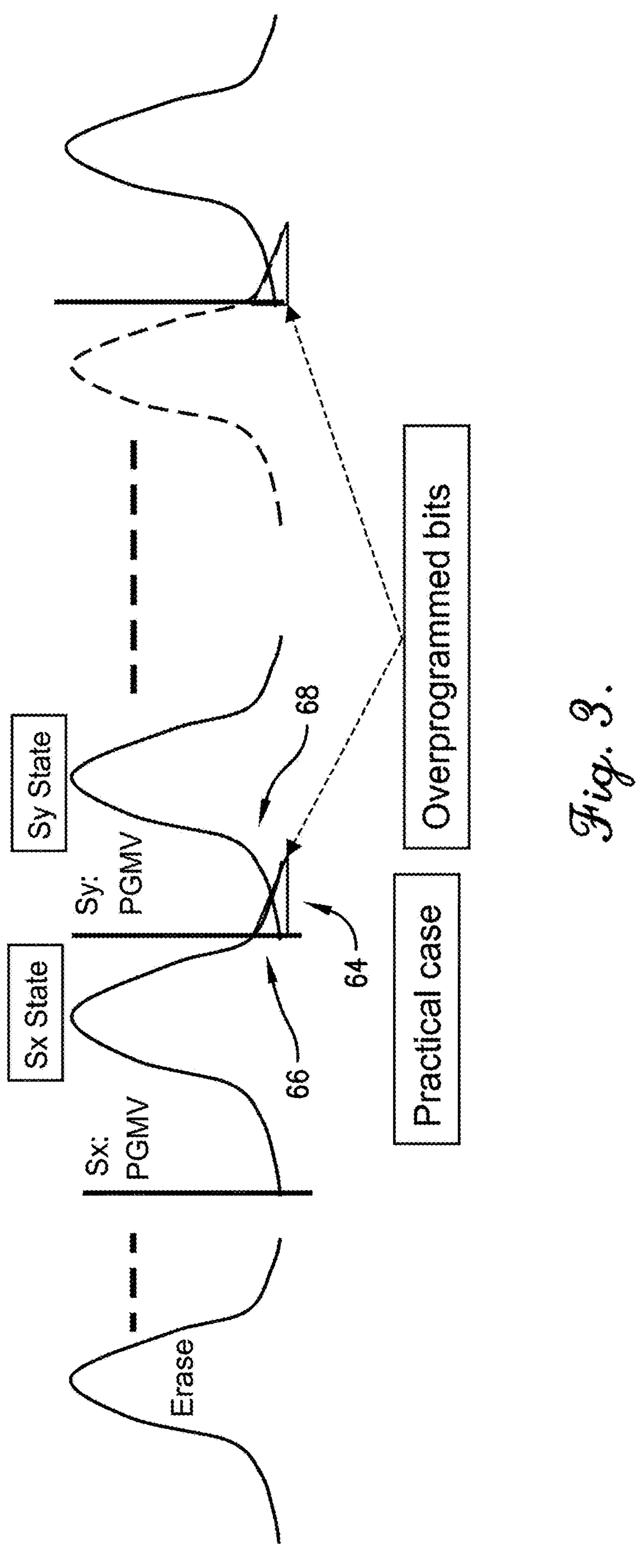
FIG. 3 is a depiction of programming of a memory cell of an SSD with over-programming such that bits belonging in the current state do overlap with the next state.

Referring to FIG. 2, the programming of an NVM cell is shown without over-programming, which is evident from the lack of overlap between the upper tail 60, or last bit, of the current Sx state and the lower tail 62, or first bit, of the next Sy state. Referring also to FIG. 3, the programming of an NVM cell is shown with over-programming, which is evident from the overlap 64 between the upper tail 66, or last bit, of the current Sx state and the lower tail 68, or first bit, of the next Sy state. Ideally, Sx and Sy are programmed so that they do not overlap after programming, as seen in FIG. 2. In actual practice, over-programming of the NVM cell, as seen in FIG. 3, may occur as follows. After a cell passes the conventional lower-tail program verification, the BL for that cell may be inhibited so that the bit cannot be further programmed. However, the fast bits may have already been bumped into the next states, such as the Sy or even the Sz state. Due to a fast bit behavior of the NVM cells, some bits tend to respond faster to the programming pulse, which results in over-programming in which bits belonging to the Sx state move into and overlap with the Sy state. These over-programmed bits can still pass the conventional lower-tail Sx program verification but they are nonetheless erroneous as the upper-tail is beyond the Sy verify level. Because different states belong to different pages on a WL, an over-programmed state that overlaps with the next state creates a hard error during the read operation that can cause a read ECC decoding failure. This over-programming behavior is dependent on both program/erase (P/E) cycle and temperature. In particular, the higher the PEC of the NAND, the more the bits may be over-programmed. Further, under otherwise similar programming conditions, programming at lower temperatures tends to be weaker and the program may use more pulses, while programming at higher temperatures results in the threshold voltage (Vt) appearing to be higher.

Figure 4:
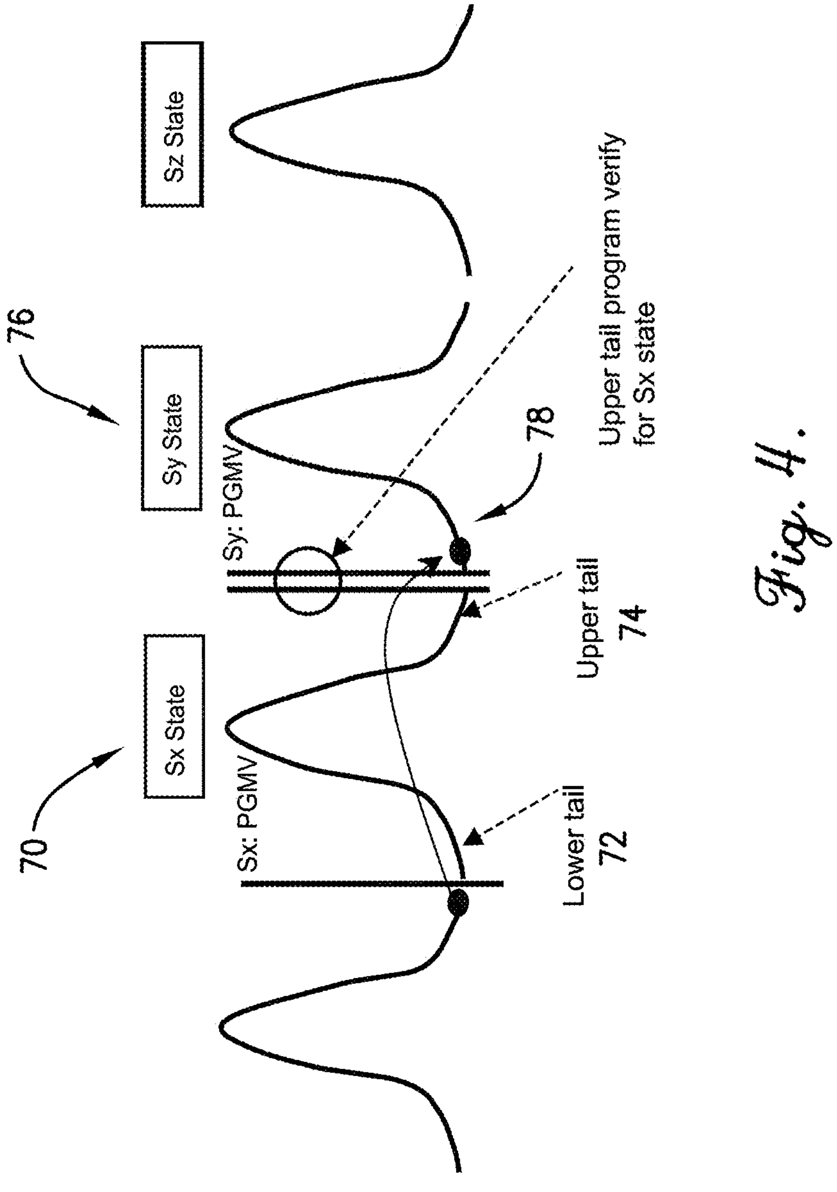
FIG. 4 is a depiction of an example of an over-programming verify operation for the current state.

Referring to FIG. 4, examples enable the SSD 20 to detect an over-programming of a NAND memory cell in the NVM media 26 and prevent hard-decoding due to over-programming. Some or all of the functions of the SSD 20 may be reflected in the operations of the method 120 described below. Following a NAND program operation of a current Sx state 70, examples perform a double verification operation to verify both the lower Sx tail 72, or first current bit, and to verify that the upper Sx tail 74, or last current bit, does not overlap the next Sy state 76. This double verification operation may be performed after the Sx state programming has been completed. The upper tail verification level can be either the Sy state program verification level (for the lower Sy tail 78) or lower than that, by, e.g., twenty-five (25) millivolts (mV) for PLCs that store five bits per cell or up to one hundred fifty (150) mV for larger cells, which can be controlled by the controller 24 through the NAND parameter setting. Thus, although the issue involves the NVM 26, the setting of the parameter for the operation can be controlled by the controller or by firmware.

The controller 24 may identify and address any over-programmed bits for decoding purposes to avoid hard decoding failures. This may be accomplished as follows. The controller 24 may create an over-programmed bit table containing the locations of detected over-programming bits. When the host 22 requests to read-out data that includes an over-programmed bit identified in the table, the controller 24 may correct the over-programmed bit inside the data frame before it is decoded. Further, the temperature and P/E cycle at which the over-programming occurs may also be recorded in the over-programmed bit table so that the next program cycle at the same or lower temperature may be weaker (e.g., smaller steps with more frequent program verify). Alternatively, if a block exhibits over-programming then the system may elect to retire the block for data security (similar to the program failure operation).

Over-programming detection may be performed routinely or selectively. In particular, over-programming is an exception event that should not occur often, so if a randomly selected location does not exhibit over-programming, then for the particular P/E cycle, there may be no need to conduct further over-programming detection operations. Additionally, selective over-programming detection may also be based on such factors as collected data about the SSD, such as the NAND characterization during the die sort and wafer sort, and on a failure signature due to over-programming during a drive qualification.

Referring to FIG. 5, an example of a method 120 of detecting an over-programming of a memory cell during a write operation in an NVM media of an SSD may include the operations set forth below. The SSD 20 may include a controller 24 and the NAND-based or other NVM media 26. Some or all of the operations of the method 120 may be reflected in the functions of the SSD 20 described above. A program operation may be performed to write data to a plurality of states of the memory cell, as shown in 122. A regular program verify operation may be performed involving checking a current first bit (e.g., the lower Sx tail 72) of a current state of the plurality of states of the memory cell for a current programming state, as shown in 124.

A current last bit (e.g., the upper Sx tail 74) of the memory cell may be checked to detect an over-programming condition of the current state in which an over-programmed current last bit overlaps a next first bit (e.g., the lower Sy tail 78) of the next state of the plurality of states of the memory cell, as shown in 126 and seen in FIG. 3. An over-programming verification level for the current last bit of the memory cell to detect an over-programming condition of the current state may be identical to or lower (e.g, between one (1) mV and twenty-five (25) mV lower for PLC, or between one (1) mV and on hundred fifty (150) mV for larger cells) than a regular programming verification level for a next first bit of the next state of the plurality of states of the memory cell. Over-programming detection may be performed routinely or selectively. In particular, over-programming detection may be selectively performed when the memory cell is determined to have been subject to a higher rate of P/E cycles than an established standard rate of P/E cycles, or when the program operation is determined to be occurring at a lower temperature than an established standard temperature.

If an over-programmed condition is not detected, the program operation may continue to write data to the next state, as shown in 128. However, if the over-programmed condition is detected, wherein an over-programmed bit can cause a hard read error that cannot be decoded even with a soft bit read, then the over-programmed current last bit may be identified and the program operation may be adjusted to use a smaller program pulse voltage step size for a subsequent program operation involving the memory cell, as shown in 130. Identifying the over-programmed bit may include recording an address and a bit location for the over-programmed current last bit, and recording a temperature for the program operation at which the over-programmed condition occurred. Alternatively, the memory block in which the over-programmed last bit is located may be retired (which can be treated as a programming failure), as also shown in 130, and the retired block may be handled accordingly.

The method 120 may further include performing a subsequent read operation to read data from the plurality of states of the memory cell, as shown in 132, and adjusting the read operation for the over-programmed current last bit to compensate for the over-programming condition, as shown in 134.

While the present disclosure has been described herein with respect to certain illustrated examples, those of ordinary skill in the art will recognize and appreciate that the present disclosure is not so limited. Rather, many additions, deletions, and modifications to the illustrated and described examples may be made without departing from the scope of the disclosure as hereinafter claimed along with their legal equivalents. In addition, features from one example may be combined with features of another example while still being encompassed within the scope of the disclosure as contemplated by the inventors.

The invention claimed is:

1. A method of detecting an over-programming of a memory cell during a write operation in a non-volatile memory media of a solid-state drive, the method comprising:

performing a program operation to write data to a plurality of states of the memory cell;

checking a current first bit of a current state of the plurality of states of the memory cell for a current programming condition;

checking a current last bit of the memory cell to detect an over-programming condition of the current state in which the current last bit overlaps a next state of the plurality of states of the memory cell; and based on the detection of the over-programming condition, performing one of the two (2) following operations—

(a) identifying the over-programmed current last bit, including recording an address and a bit location for the over-programmed current last bit and recording a temperature for the program operation at which the over-programming condition occurred, and adjusting the program operation to use a smaller program pulse voltage step size for a subsequent program operation involving the memory cell, or (b) retiring a memory block in which the over-programmed current last bit is located.

2. The method of claim 1, wherein the non-volatile memory media is a NAND-based memory media.

3. The method of claim 1, wherein an over-programming verification level for the current last bit of the memory cell to detect the over-programming condition of the current state is identical to a regular programming verification level for a next first bit of the next state of the plurality of states of the memory cell.

4. The method of claim 1, wherein an over-programming verification level for the current last bit of the memory cell to detect the over-programming condition of the current state is lower than a regular programming verification level for a next first bit of the next state of the plurality of states of the memory cell.

5. The method of claim 4, wherein the over-programming verification level is between one (1) and one hundred fifty (150) millivolts lower than the regular programming verification level used to check the next first bit of the next state of the plurality of states of the memory cell.

6. The method of claim 1, wherein checking the current last bit of the memory cell to detect the over-programming condition of the current state is selectively performed when the memory cell is determined to have been subject to a higher rate of program and erase cycles than an established standard rate of program and erase cycles.

7. The method of claim 1, wherein checking the current last bit of the memory cell to detect the over-programming condition of the current state is selectively performed when the program operation is determined to be occurring at a lower temperature than an established standard temperature.

8. The method of claim 1, further including—performing a read operation to read data from the plurality of states of the memory cell; and adjusting the read operation for the over-programmed current last bit to compensate for the over-programming condition.

9. A method of detecting an over-programming of a memory cell having a plurality of states during a write operation in a NAND-based memory media of a solid-state drive, the method comprising:

checking a current first bit of a current state of a plurality of states of the memory cell for a current programming condition;

checking a current last bit of the memory cell to detect an over-programming condition of the current state in which the current last bit overlaps a next state of the plurality of states of the memory cell, wherein an over-programming verification level used to check the current last bit of the memory cell to detect the over-programming condition of the current state is between zero (0) millivolts and one hundred fifty (150) millivolts lower than a regular programming verification level used to check a next first bit of the next state of the plurality of states of the memory cell;

performing a read operation to read data from the plurality of states of the memory cell; and based on the detecting of the over-programming condition, adjusting the read operation for the over-programmed current last bit to compensate for the over-programming condition.

10. The method of claim 9, wherein checking the current last bit of the memory cell to detect the over-programming condition of the current state is selectively performed based on at least one of— the memory cell is determined to have been subject to a higher rate of program and erase cycles than an established standard rate of program and erase cycles; and a program operation is determined to be occurring at a lower temperature than an established standard temperature.

11. A solid-state drive with over-programming detection of a memory cell during a write operation in a non-volatile memory media, the solid-state drive comprising:

the non-volatile memory media configured to store data; and a controller configured to perform a plurality of functions including— checking a current first bit of a current state of a plurality of states of the memory cell for a current programming condition, checking a current last bit of the memory cell to detect an over-programming condition of the current state in which the current last bit overlaps a next state of the plurality of states of the memory cell, and based on the detection of the over-programming condition, performing one of the two following operations—

(a) identifying the over-programmed current last bit, recording an address and a bit location for the over-programmed current last bit and recording a temperature for the program operation at which the over-programming condition occurred, and adjusting the program operation to use a smaller program pulse voltage step size for a subsequent program operation involving the memory cell, or (b) retiring a memory block in which the over-programmed current last bit is located.

12. The solid-state drive of claim 11, wherein the non-volatile memory media is a NAND-based memory media.

13. The solid-state drive of claim 11, wherein an over-programming verification level used to check the current last bit of the memory cell to detect the over-programming condition of the current state is identical to a regular programming verification level used to check a next first bit of the next state of the plurality of states of the memory cell.

14. The solid-state drive of claim 13, wherein the over-programming verification level is lower than the regular programming verification level used to check the next first bit of the next state of the plurality of states of the memory cell.

15. The solid-state drive of claim 14, wherein the over-programming verification level is between one (1) and one hundred fifty (150) millivolts lower than the regular programming verification level used to check the next first bit of the next state of the plurality of states of the memory cell.

16. The solid-state drive of claim 11, wherein checking the current last bit of the memory cell to detect the over-programming condition of the current state is selectively performed when the memory cell is determined to have been subject to a higher rate of program and erase cycles than an established standard rate of program and erase cycles.

17. The solid-state drive of claim 11, wherein checking the current last bit of the memory cell to detect the over-programming condition of the current state is selectively performed when the program operation is determined to be occurring at a lower temperature than an established standard temperature.

18. The solid-state drive of claim 11, further including— performing a read operation to read data from the plurality of states of the memory cell; and adjusting the read operation for the over-programmed current last bit to compensate for the over-programming condition.

19. A method of detecting an over-programming of a memory cell during a write operation in a non-volatile memory media of a solid-state drive, the method comprising:

performing a program operation to write data to a plurality of states of the memory cell;

checking a current first bit of a current state of the plurality of states of the memory cell for a current programming condition;

checking a current last bit of the memory cell to detect an over-programming condition of the current state in which the current last bit overlaps a next state of the plurality of states of the memory cell, wherein an over-programming verification level for the current last bit of the memory cell to detect the over-programming condition of the current state is lower than a regular programming verification level for a next first bit of the next state of the plurality of states of the memory cell, and wherein the over-programming verification level is between one (1) and one hundred fifty (150) millivolts lower than the regular programming verification level used to check the next first bit of the next state of the plurality of states of the memory cell; and based on the detection of the over-programming condition, performing one of the two (2) following operations—

(a) identifying the over-programmed current last bit and adjusting the program operation to use a smaller program pulse voltage step size for a subsequent program operation involving the memory cell, or (b) retiring a memory block in which the over-programmed current last bit is located.

20. A solid-state drive with over-programming detection of a memory cell during a write operation in a non-volatile memory media, the solid-state drive comprising:

the non-volatile memory media configured to store data; and a controller configured to perform a plurality of functions including— checking a current first bit of a current state of a plurality of states of the memory cell for a current programming condition, checking a current last bit of the memory cell to detect an over-programming condition of the current state in which the current last bit overlaps a next state of the plurality of states of the memory cell, wherein an over-programming verification level for the current last bit of the memory cell to detect the over-programming condition of the current state is lower than a regular programming verification level for a next first bit of the next state of the plurality of states of the memory cell, and wherein the over-programming verification level is between one (1) and one hundred fifty (150) millivolts lower than the regular programming verification level used to check the next first bit of the next state of the plurality of states of the memory cell, and based on the detection of the over-programming condition, performing one of the two following operations—

(a) identifying the over-programmed current last bit and adjusting the program operation to use a smaller program pulse voltage step size for a subsequent program operation involving the memory cell, or (b) retiring a memory block in which the over-programmed current last bit is located.

* * * * *